Dec. 15, 1964 L. BREWTON 3,161,030
GARBAGE RECEPTACLE WITH REFRIGERATING UNIT
Filed Oct. 11, 1962
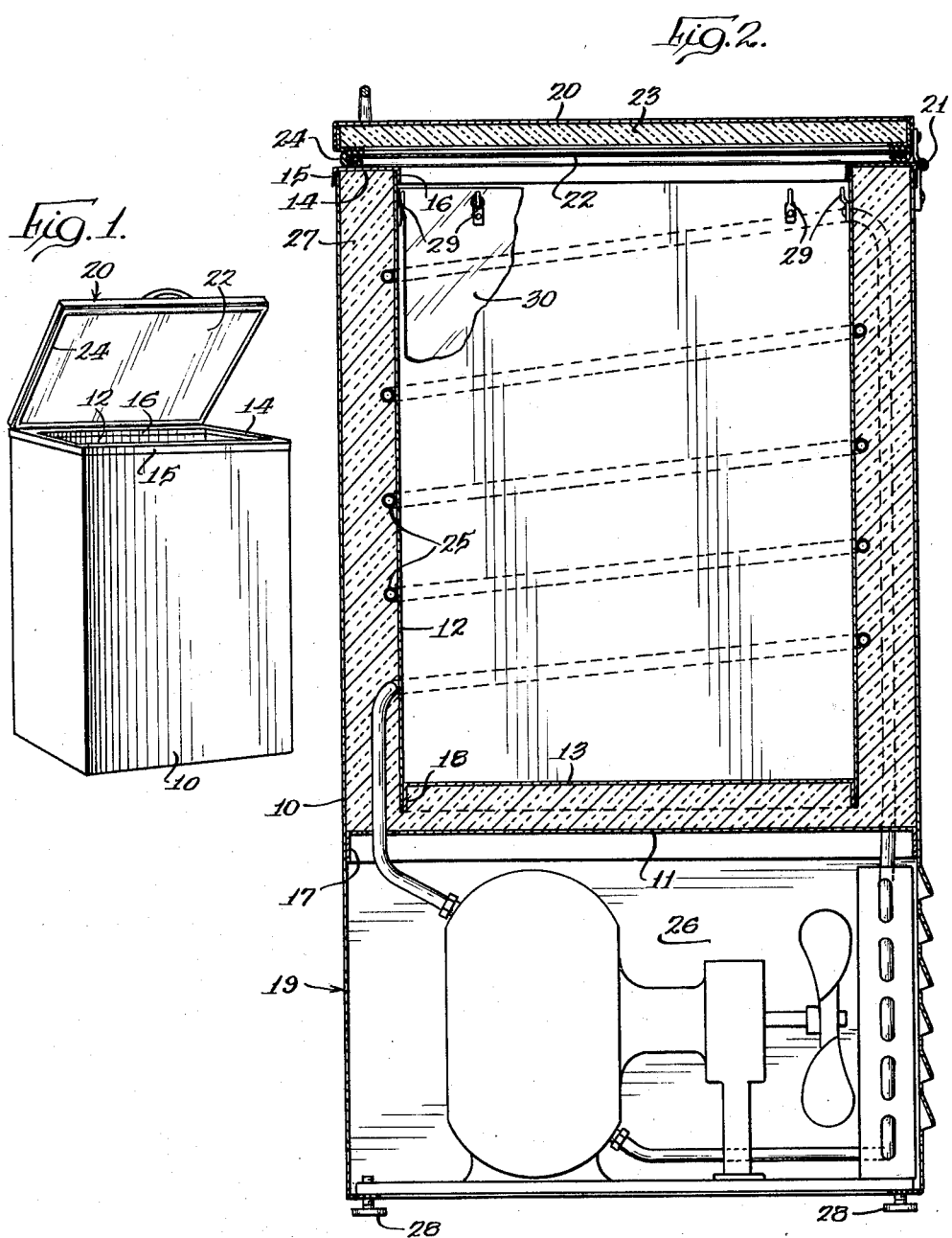
INVENTOR:
Lee Brewton
BY
Atty

United States Patent Office 3,161,030
Patented Dec. 15, 1964

3,161,030
GARBAGE RECEPTACLE WITH REFRIGERATING UNIT
Lee Brewton, R.F.D. 1, Box 134, Nokomis, Fla.
Filed Oct. 11, 1962, Ser. No. 229,908
1 Claim. (Cl. 62—440)

This invention relates to a receptacle for use in the collection and storage of garbage, such as food waste and spoilage, pending removal of said garbage from the premises occupied by said receptacle while in service.

It is an object of this invention to provide a suitable receptacle of the character indicated which will permit its installation and use indoors and to this end the receptacle incorporates features which will maintain the contents at a temperature sufficiently low to retard degradation and resulting offensive odors from said contents as well as to repel flies, gnats and other insects within the area in which said receptacle is installed and used.

The present invention is accordingly concerned with the provision of a receptacle of the character indicated which incorporates a refrigerating unit.

An embodiment of a garbage receiving and storing receptacle forming the subject of this invention is illustrated in the accompanying drawing and described in detail in the following specification. However, it is to be understood that such embodiment is set forth by way of example only and that the principles of the invention are not limited precisely thereto, excepting as defined in the appended claims.

In the drawing:

FIG. 1 is a top perspective view of a receptacle embodying the features of this invention.

FIG. 2 is a vertical axial section of the receptacle shown in FIG. 1.

Reference being had more particularly to the drawing, a garbage receiving and storing receptacle in accordance with a preferred embodiment of this invention includes an outer metal casing having a tubular upright wall 10 and a bottom wall 11 and an inner metal casing having a tubular upright wall 12 and a bottom wall 13. The upper margins of the walls 10 and 12 are joined by a rim member 14 bridging the space between said walls 10 and 12. A depending flange 15 along the outer edge of rim member 14 has welded connection with the outer surface of wall 10 while a similar flange 16 along the inner edge of rim member 14 has welded connection with the inner surface of wall 12. Bottom wall 11 is secured to the inner surface of wall 10 via a depending flange 17 along the periphery of wall 11. Bottom wall 13 is supported in upwardly spaced parallel relation to bottom wall 11 by means of a peripheral flange 18 extending downwardly from wall 13 for welded connection to the inner surface of wall 12 along the outer surface of said flange. The outer wall 10 extends downwardly from its bottom wall 11 to define a housing 19 enclosing an open area in underlying relation to bottom wall 11.

The opening at the top of the receptacle defined by the rim member 14 is provided with a closure 20 having a hinge connection with the receptacle as indicated by reference numeral 21. A lining 22 secured in spaced underlying relation to the inner surface of closure 20 defines a chamber between the closure 20 and the lining 22 in which a filler of insulating material 23 is confined.

A suitable gasket 24 secured to the closure 20 provides means for establishing a sealed joint between the rim 14 and the closure 20 when the latter is in closed position.

The temperature within the interior of the receptacle is controlled by a refrigerating coil 25 wound about the outer surface of the inner tubular wall 12 and a refrigerating unit 26 occupying a fixed position within the area enclosed by the housing 19 to which unit the coil is connected. The refrigerating unit is operated by electric current from a conventional source under control of a suitable thermostat switch which operates to open and close the circuit of the unit at selected temperature conditions. A filler of insulating material 27 is provided in the area between the inner and outer casing walls 10 and 12 so as to shield the coil 25 against loss of cooling effect by temperature conditions prevailing outside the confines of the receptacle. The insulating material 27 is also contained in the space between the bottom walls 11 and 13.

In order to secure the receptacle in accurate vertical alignment with a plumb line notwithstanding irregularities in the floor or underlying surface on which the receptacle has bearing support, suitable adjustable feet 28 are provided along the lower margin of the housing 19.

In order to facilitate removal of the contents from the receptacle and at the same time eliminate the need for frequent washing of the inside of the receptacle it is desirable to provide a throw-away liner or bag 30, such as a plastic sack. To support such a sack within the receptacle, suitable fastening means such as hooks 29 are provided along the upper margin of the inner wall 12 of the receptacle.

From the foregoing, it will be seen that a receptacle for the collection and storage of garbage has been provided for effectively handling such garbage indoors without the risk of annoying odors as well as insects in the area where the receptacle is kept and thus relieving the user from the chore of making trips to a container stationed outdoors which is especially inconvenient under inclement weather conditions.

What is claimed is:

1. A receptacle for the collection and storage indoors of garbage, said receptacle including an inner casing having a tubular upright wall and a bottom wall and an outer casing having a tubular upright wall and a bottom wall, said outer casing enclosing the inner casing to define a space between the upright walls and bottom walls of said casings, said casings being joined along upper edge portions of said upright walls by a rim member defining an entrance to said receptacle at the upper limits of said upright walls, a closure having engagement with said rim to close said entrance, a housing defined by a downward extension of the upright wall of said outer casing, a refrigerating unit occupying a fixed position within the confines of said housing, refrigerant conducting coil wound about the surface of the upright wall of the inner casing facing the inner surface of the upright wall of the outer casing, said coil being connected to said refrigerating unit, a filler of insulating material separating said coil from the inner surface of the upright wall of the outer casing and a filler of insulating material between the bottom walls of said inner and outer casings, a lining member defining the inner face of said closure and a filler of insulating material between said lining member and the surface of the closure opposite thereto, and a sealing gasket provided at the junction of said rim and said closure when said closure is in closing relation to the receptacle, a series of upwardly projecting hooks secured to the inner wall of the inner casing along a line near to but spaced downwardly from said rim member and a disposable moisture proof bag suspended in upwardly open position within the confines of said inner case via detachable engagement with said hooks.

References Cited in the file of this patent
UNITED STATES PATENTS

| | | |
|---|---|---|
| 2,531,323 | Connell | June 15, 1950 |
| 2,612,761 | Hilker | Nov. 21, 1950 |
| 3,041,852 | Palmer | July 3, 1962 |